United States Patent
Kuroda et al.

(10) Patent No.: US 9,957,368 B2
(45) Date of Patent: May 1, 2018

(54) PHENOLIC RESIN FOAM BOARD, AND METHOD FOR MANUFACTURING SAME

(71) Applicant: ASAHI KASEI CONSTRUCTION MATERIALS CORPORATION, Tokyo (JP)

(72) Inventors: Takayuki Kuroda, Tokyo (JP); Hisashi Mihori, Tokyo (JP); Takatoshi Kitagawa, Tokyo (JP)

(73) Assignee: ASAHI KASEI CONSTRUCTION MATERIALS CORPORATION, Tokyo (JP)

( * ) Notice: Subject to any disclaimer, the term of this patent is extended or adjusted under 35 U.S.C. 154(b) by 56 days.

(21) Appl. No.: 14/770,023

(22) PCT Filed: Feb. 26, 2014

(86) PCT No.: PCT/JP2014/054725
§ 371 (c)(1),
(2) Date: Aug. 24, 2015

(87) PCT Pub. No.: WO2014/133023
PCT Pub. Date: Sep. 4, 2014

(65) Prior Publication Data
US 2016/0002428 A1 Jan. 7, 2016

(30) Foreign Application Priority Data
Feb. 26, 2013 (JP) .................... 2013-036347

(51) Int. Cl.
*C08J 9/14* (2006.01)
*C08J 9/36* (2006.01)
(Continued)

(52) U.S. Cl.
CPC ............. *C08J 9/141* (2013.01); *B29C 44/30* (2013.01); *B29C 44/461* (2013.01);
(Continued)

(58) Field of Classification Search
CPC .... C08J 9/141; C08J 2361/10; C08J 2203/14; C08J 2205/052
See application file for complete search history.

(56) References Cited

U.S. PATENT DOCUMENTS

| | | | |
|---|---|---|---|
| 2010/0178458 A1 | 7/2010 | Coppock et al. | |
| 2010/0295201 A1* | 11/2010 | Mihori | B29C 39/18 264/54 |

(Continued)

FOREIGN PATENT DOCUMENTS

| | | |
|---|---|---|
| CA | 1117700 A | 2/1982 |
| CN | 101868335 A | 10/2010 |

(Continued)

OTHER PUBLICATIONS

Translation of JP 2008-024868, Arakawa et al., Feb. 7, 2008, p. 1-25.*

(Continued)

*Primary Examiner* — Hai Vo
(74) *Attorney, Agent, or Firm* — Birch, Stewart, Kolasch & Birch, LLP

(57) ABSTRACT

The present invention is a phenolic resin foam board having a thickness of 40 mm or more to 300 mm or less, when the phenolic resin foam board is sliced into n pieces (n≥5) at approximately equal intervals of 8 mm or more to 10 mm or less, a density of an n-th specimen is $d_n$, an average density of n pieces of specimens is $d_{ave}$, a lowest density among the densities of n pieces of specimens is $d_{min}$, $0 \leq (d_{ave} - d_{min})/d_{ave} \leq 0.12$ is established, and when values for $D_i = (d_i + d_{(i+1)})/2$ are calculated, $D_i$ values are plotted and points corresponding to the $D_i$ values are connected, resulting in a density distribution curve, no straight line parallel to the horizontal axis intersects the density distribution curve at four points.

9 Claims, 11 Drawing Sheets

(51) Int. Cl.
  *B29C 44/30* (2006.01)
  *B29C 44/46* (2006.01)
  *B29C 44/56* (2006.01)
  *B05B 1/20* (2006.01)
  *B05B 7/32* (2006.01)

(52) U.S. Cl.
  CPC ............ *B29C 44/5654* (2013.01); *C08J 9/36* (2013.01); *B05B 1/20* (2013.01); *B05B 7/32* (2013.01); *B29K 2065/00* (2013.01); *B29K 2995/0063* (2013.01); *C08J 2201/026* (2013.01); *C08J 2203/14* (2013.01); *C08J 2203/142* (2013.01); *C08J 2203/182* (2013.01); *C08J 2205/052* (2013.01); *C08J 2361/02* (2013.01); *C08J 2361/10* (2013.01)

(56) References Cited

U.S. PATENT DOCUMENTS

| | | |
|---|---|---|
| 2012/0270026 A1 | 10/2012 | Mihori et al. |
| 2013/0011655 A1 | 1/2013 | Hamajima et al. |
| 2013/0288038 A1 | 10/2013 | Mihori et al. |

FOREIGN PATENT DOCUMENTS

| | | |
|---|---|---|
| DE | 2037930 | 2/1971 |
| EP | 0 039 041 A2 | 11/1981 |
| EP | 2514786 A1 | 10/2012 |
| GB | 882296 A | 11/1961 |
| GB | 1304909 A | 1/1973 |
| JP | 48-13339 | 4/1973 |
| JP | 60-92809 A | 5/1985 |
| JP | 4-141406 A | 5/1992 |
| JP | 10-225993 A | 8/1998 |
| JP | 3243571 B2 | 1/2002 |
| JP | 2003-340846 A | 12/2003 |
| JP | 2005-59370 A | 3/2005 |
| JP | 2008024868 A * | 2/2008 |
| JP | 5060688 B2 | 10/2012 |
| KR | 10-2012-0094030 A | 8/2012 |
| KR | 10-2012-0120474 A | 11/2012 |
| WO | WO 2011-074611 A1 | 6/2011 |
| WO | WO 2012/053493 A1 | 4/2012 |

OTHER PUBLICATIONS

European Search Report, dated Nov. 4, 2016, for European Application No. 14757793.6.
English translation of the International Preliminary Report on International Searching Authority (Forms PCT/IB/338, PCT/IB373 and PCT/ISA/237), dated Sep. 11, 2015, for International Application No. PCT/JP2014/054725.
International Search Report (Form PCT/ISA/2010), dated May 13, 2014, for International Application No. PCT/JP2014/054725.
Patrial Supplementary European Search Report dated May 10, 2016, for European Application No. 14757793.6.

* cited by examiner

PHENOLIC RESIN FOAM BOARD, AND METHOD FOR MANUFACTURING SAME

TECHNICAL FIELD

The present invention relates to a phenolic resin foam board and a method of producing the same.

BACKGROUND ART

A phenolic resin foam board is generally produced by a method in which a foamable phenolic resin composition composed of a phenolic resin, a foaming agent, a curing catalyst, and the like (hereinafter sometimes simply referred to as a "foamable resin composition"), is kneaded by a dynamic mixer having a rotor blade and the like, the resultant mixture is ejected onto a surface material traveling at a constant speed, and then formed into a sheet between conveyors in a curing furnace. For example, as a method of using multiple ejection nozzles, a method of supplying a phenolic resin composition onto a surface material in a linear belt shape at predetermined intervals with multiple grooves (Patent Literature 1) is used.

CITATION LIST

Patent Literature

Patent Literature 1: Japanese Patent Application Laid-Open (JP-A) No. H04-141406
Patent Literature 2: Japanese Patent No. 5060688
Patent Literature 3: U.K. Patent No. 882296
Patent Literature 4: International Publication WO 2011/074611

SUMMARY OF INVENTION

Technical Problem

However, the method described in Patent Literature 1 is a method of ejecting a foamable resin composition only onto a surface material on one traveling side, therefore, at the time of producing a thick product, the surface area per unit volume of the ejected foamable resin composition becomes smaller as compared with that at the time of production of a thin product. For this reason, when a high temperature condition is set for producing a foam board product at a high speed, in a foaming and curing step, the heat internally generated by a curing reaction is increased in the central part in a thickness direction of a foamable resin composition, and further the heat is hardly radiated to the outside, as a result of which the temperature inside the foamable resin composition is excessively increased. As a result, the cell particularly in the central part of a foamable resin composition is coarsened, and easily low densified. Further, the cell is easily ruptured, and there is a problem that in a foam body, the closed cell ratio and the compression strength are decreased, and the heat conductivity is increased, that is, the heat insulating performance is deteriorated. Furthermore, in a thickness direction of a foam body, that is, in the vicinity of the surface layer part and in the inner layer part, the foaming and curing proceed unevenly, resulting in an increased density gradient, and there is also a problem that the decrease of dimensional stability is caused after the molding. The more thicker foam board product particularly results in the more increased density gradient, there thus may be a case where the method is not preferred as a production method of a thick foam board product.

During foaming and curing, in order to suppress the excessive increase of internal temperature of a foamable resin composition, that is, internal heat generation, and to prevent the product from becoming inferior, it is also considered that the heating temperature during the foaming and curing is set to low, and the retention time in a heating furnace is extended. However, this is not preferred from the viewpoint of the cost and the productivity, since the production rate is decreased, and modification of existing production equipment, for example, lengthening the heating furnace is required. Further, the phenomenon that foaming and curing become uneven in a thickness direction of a foam body, that is, in the vicinity of the surface layer part and in the inner layer part, is not also eliminated.

As a technique focusing on the density distribution in a thickness direction, a technique in which edge parts of a pair of upper and lower surface materials are connected and closed, and a foamable resin composition is foam molded between the pair of surface materials with the closed edge parts, as a result of which the density deviation of an intermediate foam layer is suppressed lower, has been proposed (see Patent Literature 2). Although this describes an effect that the density deviation of an intermediate foam layer is suppressed to 15 kg/m$^3$ or less, sufficient decrease of density deviation has not been achieved in order to obtain an effect of improving compression strength, improving dimensional stability, and the like. Further, since the density of the surface foam layer and the intermediate foam layer discontinuously varies, an effect of suppressing the sink or expansion in a cross section is not also sufficient. Furthermore, although there is a description concerning the production of a foam body having a thickness of 25 mm, or 50 mm, a problem of suppressing internal heat generation can arise in the production of a thick foam body having a thickness of 70 mm or more.

As another technique focusing on a density distribution in a thickness direction, a technique in which ejection parts for multiple materials are provided, and multilayer molding is performed via a resin film, a metal plate, or the like in a boundary part, has also been proposed (see Patent Literature 3). There is a description that when this technique is used, by the adjustment of the density and thickness of a surface layer part and an inner layer part, for example, by the setting of the density of a surface layer part as being higher than that of an inner layer part, the properties such as strength can be improved. However, in this technique, there is a problem that the production apparatus is complicated and the cost is increased because multiple kinds of ejection materials, films, and the like are required. Further, the density in a thickness direction discontinuously varies, therefore, an effect of suppressing the sink or expansion in a cross section is not also sufficient.

As another technique of suppressing the excessive increase of internal temperature of a foamable resin composition, a method of ejecting a resin composition individually onto upper and lower surface materials has also been proposed (Patent Literature 4). When this technique is used, areas having a low density are dispersed in the density distribution in a thickness direction, resulting in a local destruction prevention effect during compression, and further the improvement of the heat insulating performance can be realized. However, in this technique, there may be a case where device for the equipment to hold the upper side surface material, onto which a foamable phenolic resin composition has been coated, and the plant investment associated with the device, are required.

The density unevenness in the vicinity of each of upper and lower surface layer parts of a foam body cannot be eliminated, and there is a steep area of a density gradient also in the vicinity of the center position in a thickness direction, therefore, there may be a case where the sink and expansion are generated in a cross section of a foam body, and become a factor of gaps during application.

Furthermore, it is difficult to completely equalize the density distributions in a upper layer part and a lower layer part, which are bordered by the vicinity of the center position in a thickness direction, and there may be a case where the warpage caused by the difference of the dimensional stability between the upper layer part side and the lower layer part side is generated in the entire foam body.

An object of the present invention is to provide a phenolic resin foam board, which exhibits sufficient compression strength and heat conductivity for practical use even when the thickness of a product increases, and has excellent dimensional stability as compared with that in a conventional product, and a production method thereof.

Solution to Problem

The present invention provides the following [1] to [10].
[1] A phenolic resin foam board having a thickness of 40 mm or more to 300 mm or less, in which
when the phenolic resin foam board is sliced, from one main surface of the phenolic resin foam board, along the main surface into n pieces (n≥5) at approximately equal intervals of 8 mm or more to 10 mm or less in a thickness direction, a density of a n-th specimen is $d_n$, an average density of n pieces of specimens is $d_{ave}$, and a lowest density among the densities of n pieces of specimens is $d_{min}$, $0 \leq (d_{ave} - d_{min})/d_{ave} \leq 0.12$ is established, and
when values for $D_i = (d_i + d_{(i+1)})/2$ are calculated [in which i represents an integer of 1 to (n−1)], $D_i$ values are plotted in order of a numerical value of i (in which a horizontal axis indicates i values and a vertical axis indicates $D_i$ values), and points corresponding to the $D_i$ values are connected, resulting in a density distribution curve, no straight line parallel to the horizontal axis intersects the density distribution curve at four points.
[2] The phenolic resin foam board according to [1], in which
when specimens obtained by equally dividing the phenolic resin foam board into five pieces along the main surface of the phenolic resin foam board in a thickness direction is set as P1, P2, P3, P4, and P5 in order from the main surface, at least either one of $d_{P3} \leq d_{P2}$, or $d_{P3} \leq d_{P4}$ is established among a density $d_{P2}$ of P2, a density $d_{P3}$ of P3, and a density $d_{P4}$ of P4.
[3] The phenolic resin foam board according to [1] or [2], in which the thickness is 70 mm or more to 200 mm or less.
[4] The phenolic resin foam board according to any one of [1] to [3], in which a density of the entire phenolic resin foam board is 10 kg/m$^3$ or more to 100 kg/m$^3$ or less, and a closed cell ratio is 80% or more.
[5] The phenolic resin foam board according to any one of [1] to [4], in which a heat conductivity is 0.023 W/m·K or less.
[6] The phenolic resin foam board according to any one of [1] to [5], comprising a hydrocarbon and/or a chlorinated hydrocarbon.
[7] A method of producing a phenolic resin foam board, the method including an introducing step of mixing at least a phenolic resin, a foaming agent, and a curing agent, thereby obtaining a foamable phenolic resin composition,
a distribution pipe distributing and widening the foamable phenolic resin composition, in which
the foamable phenolic resin composition is mixed by a static mixer in the distribution pipe, and ejected from an ejection opening onto a traveling surface material.
[8] The method according to [7], in which
in the distribution pipe, the foamable phenolic resin composition is distributed and widened multiple times through multiple distribution paths,
in each flow path from a piping part on a most upstream side to the multiple ejection openings, the static mixer is provided in at least one of the piping parts, and the piping parts in each of which a static mixer is not provided are not continuously arranged except for a piping part containing a most end ejection opening.
[9] The production method according to [7] or [8], in which the static mixer has a temperature adjustment function.
[10] The production method according to any one of [7] to [9], in which a temperature of the foamable phenolic resin composition at the ejection opening is adjusted to 30° C. or more to 50° C. or less.

In the production method of a phenolic resin foam board according to the present invention, it can be realized that the temperature distribution inside a foamable phenolic resin composition is uniformized particularly by providing a static mixer in a distribution pipe, and internal heat generation locally generated during curing is suppressed in a foaming and curing process, resulting in the homogenized foaming state. According to this, also in an efficient production condition such as a high temperature condition, a thick and high-quality foam board can be made without damaging the cell film of a foamable resin composition.

As described above, the present inventors have found that a phenolic resin foam board having a characteristic structure in which a density distribution is homogenized in a thickness direction can be produced with high efficiency, and a phenolic resin foam board in which dimensional stability and the like have been improved as compared with those in the conventional product can be obtained.

Advantageous Effects of Invention

According to the present invention, a phenolic resin foam board, which exhibits sufficient compression strength and heat conductivity for practical use even when the thickness of the product increases, and has excellent dimensional stability as compared with that in a conventional product, and a production method thereof can be provided.

DESCRIPTION OF EMBODIMENTS

Hereinafter, the present invention will be described in detail according to the suitable embodiments. In order to facilitate the understanding of the description, the same reference number is provided for the same constituent element in each drawing as far as possible, and the overlapping descriptions are omitted. Further, the dimensions in each drawing may be exaggerated in some parts for the explanation, and do not always match the actual dimension ratio.

The phenolic resin foam board in the present embodiment (hereinafter, sometimes referred to as a "foam board") is a foam board in which a large number of cells are present in a dispersed state in a phenolic resin formed by a curing reaction. The thickness in a foam board is in the growing direction during the foaming of a foamable resin composition on a surface, and indicates a side having the smallest size among the three sides of the foam board. Further, the foam board has a main surface that is a surface perpendicular to the thickness direction.

A phenolic resin foam board of the present embodiment has a homogenized density distribution in a thickness direction, and the indicator of the homogeneity can be evaluated by the following technique. Specifically, when the phenolic resin foam board is sliced into n pieces at approximately equal intervals of 8 mm or more to 10 mm or less from one main surface of the phenolic resin foam board in a thickness direction along the main surface, an average density of n pieces of specimens (sliced products) is $d_{ave}$, and a lowest density among the densities of n pieces of specimens is $d_{min}$, the phenolic resin foam board of the present embodiment satisfies the relationship that an H value $((d_{ave}-d_{min})/d_{ave})$ is $0 \leq H \leq 0.12$, and satisfies the range of preferably $0 \leq H \leq 0.10$, and more preferably $0 \leq H \leq 0.09$.

The H value that is an indicator of the homogeneity of density distribution in a thickness direction satisfies the relationship described above, as a result of which the homogeneity of density distribution of a phenolic resin foam board of the present embodiment in a thickness direction is improved, and local destruction in a low density part is suppressed, therefore, the compression strength is improved. Further, in a cross section of a foam board, the density difference between the surface layer part and the inner layer part becomes small, therefore, the sink or expansion during absorbing moisture and during drying is suppressed, and the dimensional stability is improved. Furthermore, a homogenized foam board can be produced as a sliced product from a portion in which the density in a thickness direction is almost homogenized in the inner layer part, and used, which improves the productivity.

Figure 1:
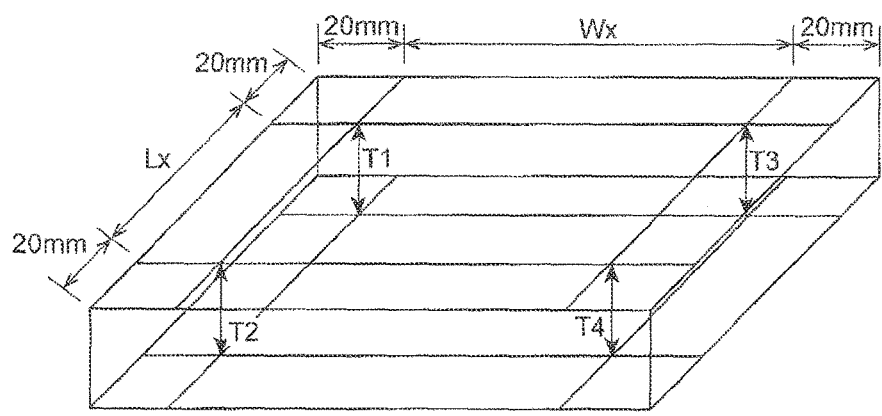
FIG. 1 is an overhead view showing measurement positions of the thickness in a specimen of a phenolic resin foam board.
Figure 2:
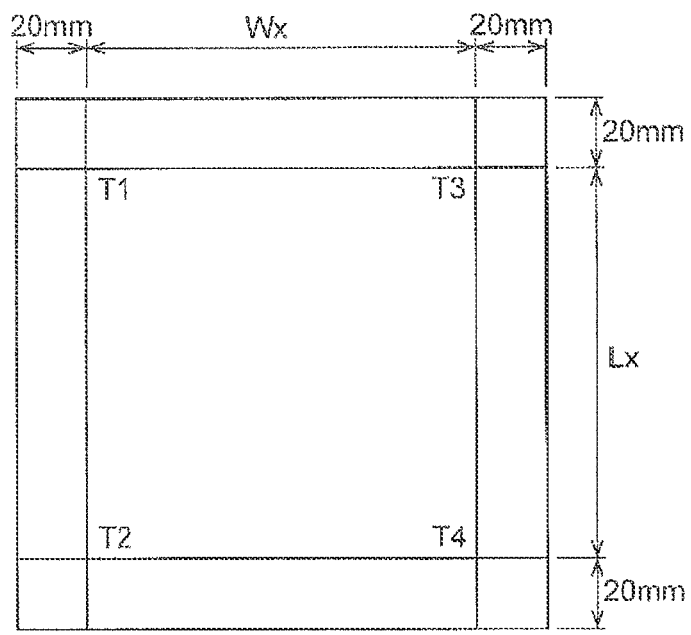
FIG. 2 is a top view showing measurement positions of the thickness in a specimen of a phenolic resin foam board.

In order to measure the above density, firstly, the size of a foam body is preferably a size with which the density is easily measured, for example, the portion to measure the density is cut out from a foam body (hereinafter, referred to as a "cut portion of foam body) so as to be 200 mm×200 mm×thickness (in this case, each of $W_X$ and $L_X$ in FIG. 1 and FIG. 2 is 160 mm). At this moment, in a case of having a surface material, the surface material is peeled off. The cut portion of foam body is sliced, in parallel to the one of the main surfaces, into n pieces at approximately equal intervals of 8 mm or more to 10 mm or less in a thickness direction of the cut portion of foam body, and the density of each of the specimens is measured. The cutting interval Z of each specimen is determined as follows.

Firstly, in a case where the thickness Z (unit: mm) of a foam body is 40 mm or more to less than 50 mm, a quotient p (integer) and a remainder $Z_2$ obtained by dividing Z by 8 are calculated by Equation (1), and the cutting interval z is determined by the following Equation (2). According to this, quotient p=5, and cutting number n=5 are uniquely determined.

$$Z = 8 \times p + Z_2 \tag{1}$$

$$n = p, z = 8 + Z_2/p \tag{2}$$

In a case where the thickness Z (unit: mm) of a foam body is 50 mm or more to less than 300 mm, a quotient p (integer) and a remainder $Z_3$ obtained by dividing Z by 10 are calculated by Equation (3). Herein, the following case classification by the value of $Z_3$ is performed, and the cutting number and the cutting interval z are determined by Equation (4) or Equation (5).

$$Z = 10 \times p + Z_3 \tag{3}$$

in a case of $0 \leq Z_3 \leq 5$: n=p, $$z = 10 + Z_3/p \tag{4}$$

in a case of $5 \leq Z_3 < 10$: n=p+1, $$z = 10 - (10 - Z_3)/(p+1) \tag{5}$$

The cutting method and the cutting measure at this moment are not particularly limited. Loss of a portion corresponding to the thickness of a blade used for the slicing is generated, and there may be a case where a fine difference is generated among the thicknesses of the specimens to be obtained, however, even in such a case, the specimens can be handled as the specimens sliced at approximately equal intervals of 8 mm or more to 10 mm or less.

Figure 3:
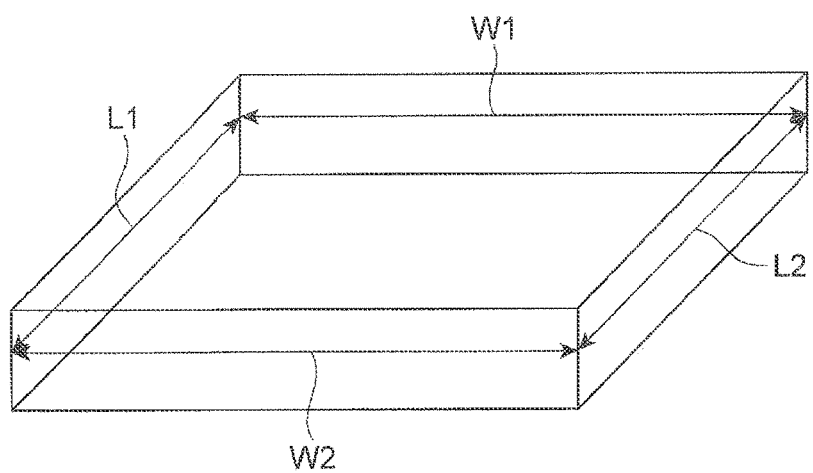
FIG. 3 is an overhead view showing measurement positions of the size in a specimen of a phenolic resin foam board.
Figure 4:
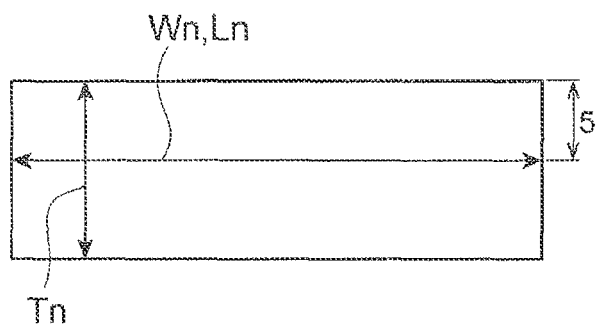
FIG. 4 is a side view showing measurement positions of the size in a specimen of a phenolic resin foam board.

Herein, in order to determine the density $d_n$ of each specimen, firstly, the thicknesses at four lattice points, each of which is 20 mm from each side of a corner of the main surface, are measured, and the average value ($T_n$) of the thicknesses of a specimen is calculated in accordance with Equation (6) (see FIG. 1, and FIG. 2). Further, lengths in a width direction and lengths in a length direction of a specimen are measured, respectively in two points, each of which is 5 mm from one main surface, and each of the average values ($W_n$, and $L_n$) is calculated in accordance with Equation (7) and Equation (8) (see FIG. 3, and FIG. 4). After that, the weight ($G_n$) of each specimen is measured, and then the density ($d_n$) of each specimen is calculated in accordance with Equation (9) (n=2 to 4).

$$T_n = \{T_1 + T_2 + T_3 + T_4\}/4 \tag{6}$$

$$W_n = \{W_1 + W_2\}/2 \tag{7}$$

$$L_n = \{L_1 + L_2\}/2 \tag{8}$$

$$d_n = G_n / \{T_n \times W_n \times L_n\} \tag{9}$$

The average density $d_{ave}$ of the n pieces of specimens, which have been obtained as described above, is calculated. When the minimum density among the densities of n pieces of specimens is set as $d_{min}$, the phenolic resin foam board of the present embodiment satisfies the relationship that an H value $((d_{ave} - d_{min})/d_{ave})$ is $0 \leq H \leq 0.12$. The phenolic resin foam board of the present embodiment, of which the H value is in this range, is characterized in that the homogeneity of the density distribution is high, and a part having locally-lowered strength and a part having different dimensional stability are hardly present.

In addition, the phenolic resin foam board of the present embodiment has a characteristic that when values for $D_i = (d_i + d_{(i+1)})/2$ are calculated, $D_i$ values are plotted in order of a numerical value of i (in which a horizontal axis indicates i values and a vertical axis indicates $D_i$ values), and points corresponding to the $D_i$ values are connected, resulting in a density distribution curve, no straight line that is parallel to the horizontal axis intersects the density distribution curve at four points. Herein, i represents an integer of 1 to (n−1).

Figure 9:
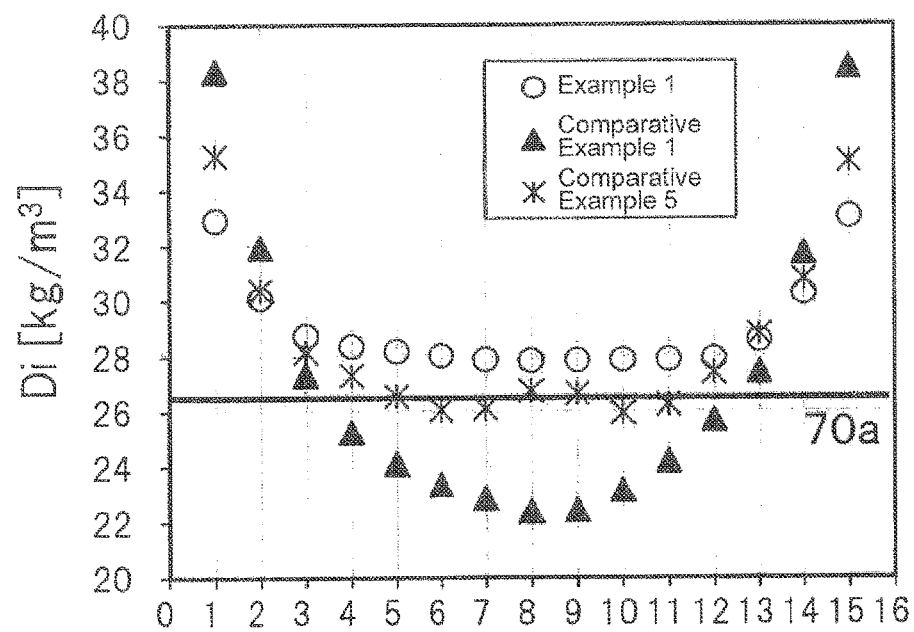
FIG. 9 is a drawing showing a density distribution curve of Example 1, and Comparative Examples 1 and 5 in a phenolic resin foam board of the present embodiment.

The density evaluation using the $D_i$, which is an average value of two densities of i and (i+1), is performed in order to extract the tendency of a density distribution of a phenolic resin foam board. When a portion having a higher density as compared with that in the surroundings is present inside a phenolic resin foam board in a thickness direction, a straight line that intersects the density distribution curve at four points and is parallel to the horizontal axis is present. FIG. 9 is a drawing in which $D_i$ is calculated by using a foam board of each of Example 1, Comparative Example 1, and Comparative Example 5, which are described below, and shows a plotted density distribution curve. As shown in FIG. 9, for example, a straight line that intersects the density distribution curve of Example 1 at four points and is parallel to the horizontal axis is not present, while a density distribution curve of Comparative Example 5 intersects a straight line 70a at four points. As described above, since an H value $((d_{ave} - d_{min})/d_{ave})$ satisfies the relationship of $0 \leq H \leq 0.12$, and no straight line parallel to the horizontal axis intersects the density distribution curve plotted with $D_i$ at four points, a phenolic resin foam board of the present embodiment comprises no steep area of a density gradient in the vicinity of the center position in a thickness direction, thereby the sink and expansion are hardly generated in a cross section of a foam body, and the dimensional stability is improved.

An area having a low density, and an area having a high density are present in the density evaluation in a thickness direction of the phenolic resin foam board of the present embodiment. When specimens obtained by equally dividing the foam board into five pieces along the main surface of the foam board in a thickness direction is set as P1, P2, P3, P4, and P5 in order from the main surface, at least either one of $d_{P3} \leq d_{P2}$, or $d_{P3} \leq d_{P4}$ is established among a density $d_{P2}$ of P2, a density $d_{P3}$ of P3, and a density $d_{P4}$ of P4. That is, it is characterized in that the density of a specimen P3 is the same as or lower than the density of a specimen P2 and/or the density of a specimen P4. As described above, having a structure in which there is no layers with maximum of the density and the density becomes higher from a layer with the minimum density towards both main surfaces in the density distribution in a thickness direction of a foam board, multiple layers in each of which the density becomes minute are not present, thereby the local strength decrease, and the warpage or deflection of the entire foam board can be suppressed.

In order to measure the above density, firstly, the size of a foam body is preferably a size with which the density is easily measured, for example, a portion for the measurement of the density is cut out from a foam body (hereinafter, referred to as "cut portion of foam body") so as to be 200 mm×200 mm×thickness (in this case, each of $W_X$ and $L_X$ in FIG. 1 and FIG. 2 is 160 mm). At this moment, in a case of having a surface material, the surface material is peeled off. The cut portion of foam body is sliced, in parallel to the one of the main surfaces, into five pieces at equal intervals in a thickness direction of the cut portion of foam body, and the resulting specimens are set as P1, P2, P3, P4, and P5 in order from the main surface. Herein, P1 and P5, each of which contains a main surface or a surface material, are removed, and each density of P2 to P4 is measured. A cutting method and a cutting measure in this case are not particularly limited. Loss of a portion corresponding to the thickness of a blade used for the slicing is generated when a foam body is sliced into five pieces at equal intervals, and there may be a case where a fine difference is generated among the thicknesses of the five specimens to be obtained, however, even in such a case, the specimens can be handled as the specimens sliced into five pieces at equal intervals.

Herein, in order to determine the density $d_{pm}$ of each specimen, firstly, the thicknesses at four lattice points, each of which is 20 mm from each side of a corner of the main surface, are measured, and the average value $(T_{pm})$ of the thicknesses of a specimen is calculated in accordance with Equation (10) (see FIG. 1, and FIG. 2). Further, lengths in a width direction and lengths in a length direction of a specimen are measured, respectively in two points, each of which is 5 mm from one main surface, and each of the average values $(W_m,$ and $L_m)$ is calculated in accordance with Equation (11) and Equation (12) (see FIG. 3, and FIG. 4). After that, the weight $(G_m)$ of each specimen is measured, and then the density $(d_{pm})$ of each specimen is calculated in accordance with Equation (13) (m=2 to 4).

$$T_m = \{T_1 + T_2 + T_3 + T_4\}/4 \tag{10}$$

$$W_m = \{W_1 + W_2\}/2 \tag{11}$$

$$L_m = \{L_1 + L_2\}/2 \tag{12}$$

$$d_{pm} = G_m / \{T_m \times W_m \times L_m\} \tag{13}$$

The phenolic resin foam board according to the present embodiment characterized in that the thickness is 40 mm or more to 300 mm or less. In general, the density in a thickness direction of a foam body is higher in the surface layer part, and lower in the inner layer part, and due to the difference of the density depending on positions in a thickness direction, there is a risk that the warpage in a length direction or width direction of a foam board, or the sink in a cross section of a foam board is generated. However, particularly when the thickness is 50 mm or more, the ratio of the inner layer part increases, resulting in an improved bending resistance as the entire board improves, there is thus a tendency that the warpage is suppressed. On the other hand, when the thickness increases, the production rate decreases, therefore, from the viewpoint of the productivity and the warpage suppression, the thickness is more preferably 70 mm or more to 200 mm or less, furthermore preferably 80 mm or more to 180 mm or less, and most preferably 100 mm or more to 160 mm or less.

As the density of the entire phenolic resin foam board, an intended value can be selected based on the conditions of the proportion of a foaming agent, the oven temperature during curing, and the like. The density is preferably in a range of 10 kg/m$^3$ or more to 100 kg/m$^3$ or less, more preferably in a range of 15 kg/m$^3$ or more to 60 kg/m$^3$ or less, and furthermore preferably in a range of 20 kg/m$^3$ or more to 60 kg/m$^3$ or less. In a case where the density is less than 10 kg/m$^3$, the mechanical strength such as compression strength decreases, therefore, the foam body is easily damaged during handling, and the brittleness on a surface increases, and this is not preferred. Further, when the density exceeds 100 kg/m$^3$, there is a risk that the heat transmission in a resin part increases, and the heat insulating performance decreases, and further the cost increases, therefore, this is not preferred.

The closed cell ratio of a phenolic resin foam board is preferably 80% or more, and more preferably 90% or more. When the closed cell ratio is less than 80%, there may be a case where a foaming agent in a phenolic resin foam board is substituted with air and the heat insulating performance is easily decreased, therefore, this is not preferred. The closed cell ratio in the present embodiment shows a proportion (%) of closed cell volume to the apparent volume calculated from the external size of a sample of a foam body.

The heat conductivity of a phenolic resin foam board is preferably 0.023 W/m·K or less, more preferably 0.015 or more to 0.023 W/m·K or less, furthermore preferably 0.015 or more to 0.021 W/m·K or less, and particularly preferably 0.015 or more to 0.019 W/m·K or less.

Further, a hydrocarbon is preferably contained in a cell inside the present phenolic resin foam board. When the foaming agent in a foamable phenolic resin composition contains a hydrocarbon, the hydrocarbon is contained in a cell inside a foam body. When a hydrocarbon is contained in a cell, the heat insulating performance of a foam board is improved as compared with a case where air is contained in a cell, therefore, this is preferred. For the purpose of the improvement of the heat insulation, the improvement of the formability, and the like, it is preferred that a chlorinated hydrocarbon is used as a replacement for the hydrocarbon, or a hydrocarbon and a chlorinated hydrocarbon are used in combination.

Next, the production method of the present phenolic resin foam board will be described.

The method of producing a phenolic resin foam board according to the present embodiment is a method of producing a phenolic resin foam board comprising an introducing step of mixing at least a phenolic resin, a foaming agent, and a curing agent, thereby obtaining a foamable phenolic resin composition, and a distribution pipe (in a distribution step) distributing and widening the foamable phenolic resin composition, wherein the foamable phenolic resin composition is statically mixed in a distribution pipe, and ejected from multiple ejection openings onto a traveling surface material. In addition, the term, widen, used herein indicates to widen the space of the ejection opening to a direction perpendicular to the traveling direction of a surface material (a width direction of a surface material).

Figure 5:
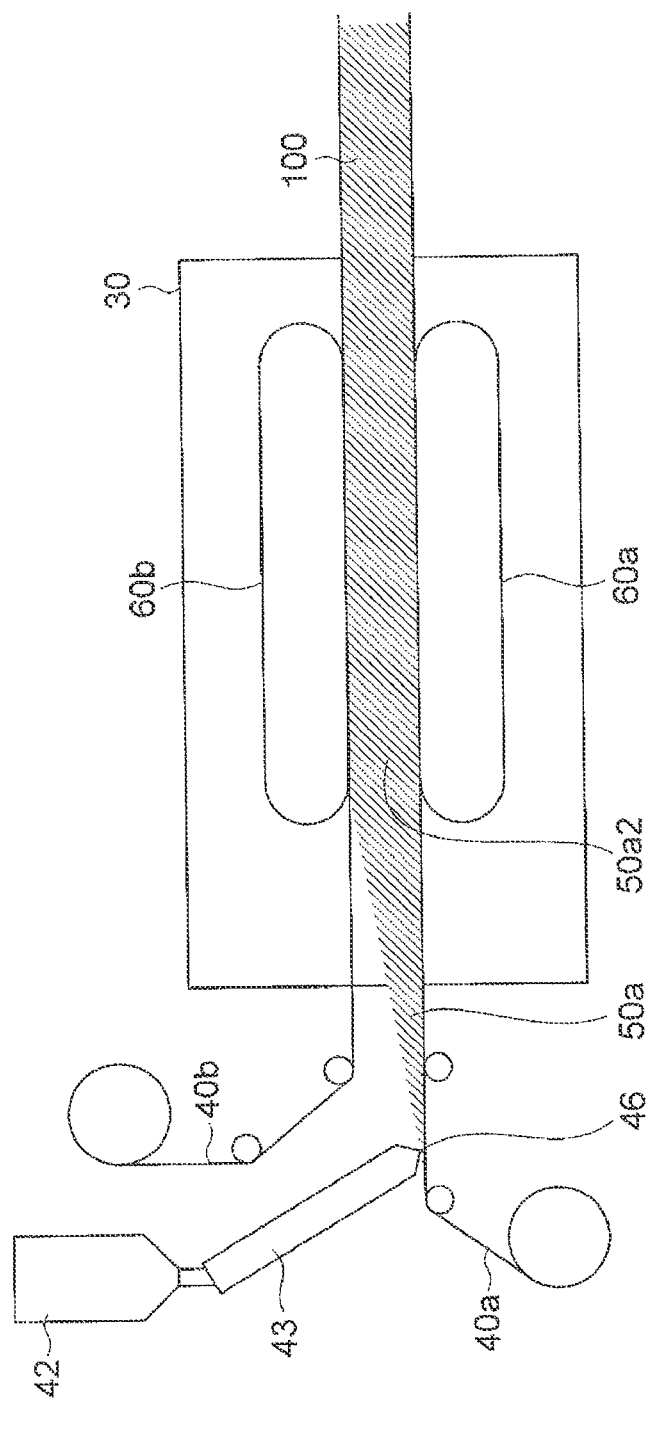
FIG. 5 is an explanatory drawing showing a method of producing a phenolic resin foam board of the present embodiment.

FIG. 5 is an explanatory drawing showing a method of producing a phenolic resin foam board of the present embodiment. As shown in FIG. 5, the present production method provides a mechanism in which the first surface material 40a is arranged on the lower side, and the second surface material 40b is on the upper part, and the first surface material 40a and the second surface material 40b can travel in the same direction by a slat-type double conveyor 60a, 60b.

Further, in an introducing step of the present production method, at least a phenolic resin, a foaming agent, and a curing agent are mixed by a mixer 42. In the introducing step, a finely ground powder of a phenolic resin foam board, paraformaldehyde, a powder such as an inorganic fine particle, a surfactant, and the like may be added.

Although any of a dynamic mixer and a static mixer may be used as the mixer 42, a dynamic mixer is preferably used in view of efficiently stirring the components described above in a short period of time. For example, a so-called pin mixer, a Hobart-type batch mixer, or an Oakes-type continuous mixer (Japanese Patent Application Publication No. S40-17143) and the like, which have a structure in which a rotor having a large number of blades (projections) rotates in a cylindrical vessel having a large number of projections on the inner wall thereof, and the blades rotate together with the rotation of the rotor between the projections, without being brought into contact with the projections, can be used.

Figure 6:
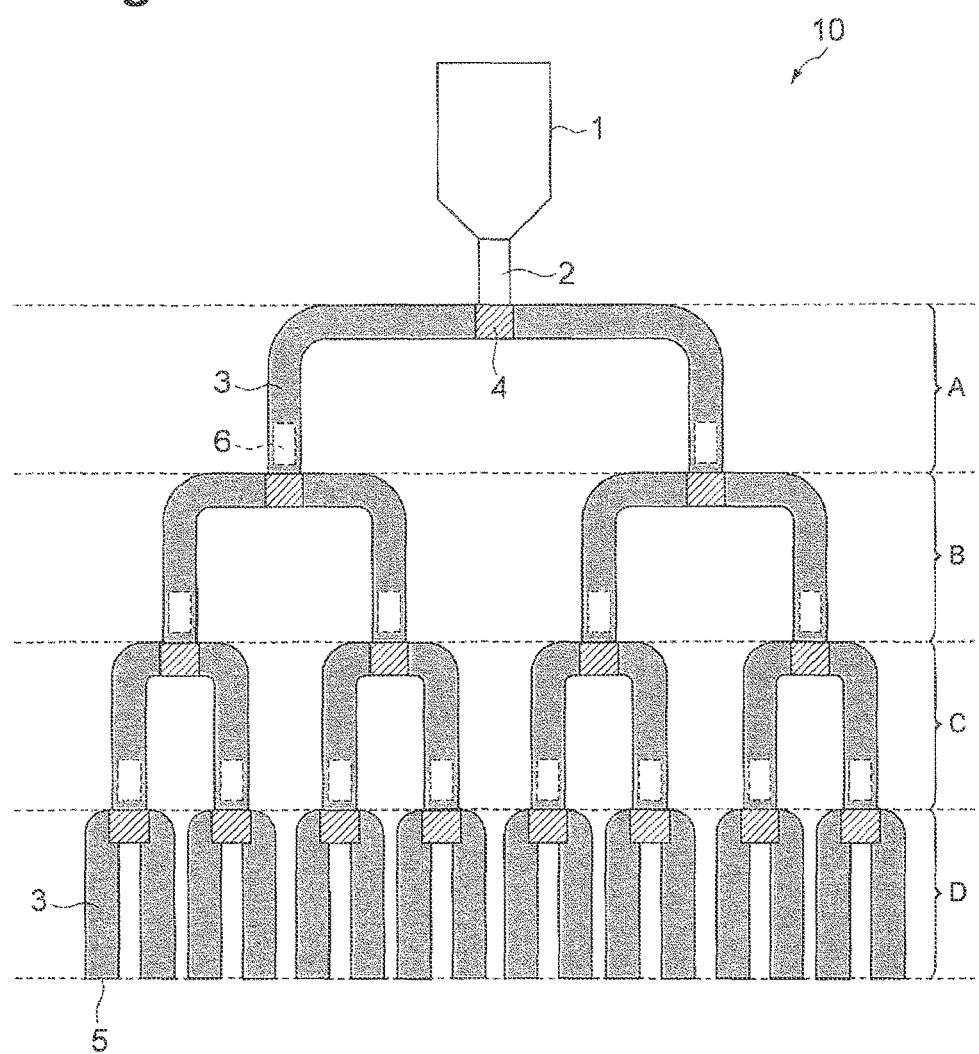
FIG. 6 is a schematic diagram showing one example of a production equipment of a phenolic resin foam board of the present embodiment.

Next, FIG. 6 is a schematic diagram showing a part of a production equipment of a phenolic resin foam board of the present embodiment. A mixer 1 that mixes a foamable phenolic resin composition is connected to a distribution pipe 10 by an introduction piping part 2. One branch part 4, and an interval that is between the one branch part 4 and multiple branch parts 4 on the further downstream side, which are connected to the one branch part 4, are collectively referred to as a distribution path (for example, A to D). In FIG. 6, an interval between a branch part 4 and a branch part 4 (without containing the branch parts 4), and an interval from a branch part 4 to an ejection part 5 on the downstream side (without containing the branch part 4) are simply referred to as a piping part 3, and the distribution path described above is constituted of a branch part 4 and the multiple piping parts 3 that are connected to the downstream side of the branch part 4.

As shown in FIG. 6, a foamable phenolic resin composition is preferably distributed multiple times through multiple distribution paths (for example, A to D) in the distribution pipe 10, which is one example of the present production method. Herein, in each flow path from a piping part 3 on a most upstream side to multiple ejection openings 5, it is preferred that a static mixer 6 is provided in at least one of the piping parts, and piping parts 3 in each of which a static mixer 6 is not provided are not continuously arranged except for a piping part 3 containing a most end ejection opening 5.

A foamable phenolic resin composition that has been homogeneously mixed by a mixer 1 is distributed and widened by a subsequently connected distribution pipe 10 (constituted of distribution paths A to D). At that time, in a common production method, temperature difference of a resin composition is generated between on the outside and on the inside in a cross-section direction of a flow path in a distribution pipe, which may result in an uneven flow rate among the flow paths, since a flow rate increases in a high-temperature part where the viscosity becomes low, while a flow rate decreases in a low-temperature part where the viscosity becomes high. However, in the production method of the present embodiment, a foamable phenolic resin composition passes through the static mixer 6 in the distribution path, thereby the temperature of the foamable phenolic resin composition in the flow path is uniformized, as a result of which the temperature of the resin composition between the flow paths is also uniformized, and ideal homogenized ejection can be performed. In addition there is an effect that the suppression of the deviation of the flow rate between the flow paths eliminates the nonuniformity of product qualities of uneven thickness, uneven strength and the like in a width direction of a foam product, which are caused by uneven flow rate, and thereby improving the product qualities as well as improving the productivity with greater yield.

In piping parts, except for the piping parts containing a most end ejection opening, the foamable resin composition that passes through a flow path in which the piping parts 3 without the static mixer 6 are continuously arranged, is equally distributed in a branch part on the upstream side in which the static mixer is not provided, and then further secondly distributed in a state of not being statically mixed in a branch part 4 on the downstream side, as a result of which there is a risk that uneven flow rate caused by the temperature difference between on the outside and on the inside of a piping flow path is generated.

From the viewpoint of the temperature control, the easiness of disassembling and cleaning, and the like, a metal is preferably used as the material of the distribution path. However, an arbitrarily part may be replaced with a tube made of a resin. Tubes made of polytetrafluoroethylene, polyethylene, or nylon, and the like can arbitrarily be selected as the tube made of a resin.

The static mixer 6 is not particularly limited, and may be any one of commercially available static mixers. However, examples of the static mixer 6 include a fluid mixer in which multiple fluid mixing elements are connected in series, and the elements combine: at least two substantially linear fluid passages having a spiral blade inside and being connected in parallel to each other, with another fluid passage that is arranged in common to those fluid passages and collects a fluid to be mixed on the upstream side while dividing it on the downstream side. The fluid passages provided in parallel are arranged so that a line connecting each of the centers thereof intersects a line connecting the centers of other adjacent fluid mixing elements and this line connecting the centers also intersects the direction of a blade end part on the upstream side and on the downstream side of the spiral blade. Examples of the preferred static mixer include a static mixer manufactured by NORITAKE CO., LIMITED, and a static mixer manufactured by Toray Engineering Co., Ltd.

The temperature adjustment function of a static mixer 6 adjusts the temperature of a foamable phenolic resin at an ejection opening preferably to be 30° C. or more to 50° C. or less, more preferably to be 35° C. or more to 50° C. or less, furthermore preferably to be 40° C. or more to 50° C. or less, and most preferably to be 40° C. or more to 45° C. or less. In a case where the temperature described above is less than 30° C., there is a risk that the curing of the obtained foam body may be insufficient and further a foam product having a predetermined density or thickness is not obtained, due to the decrease of foaming efficiency associated with the decrease of internal temperature of a foamable phenolic resin composition. In a case where the temperature described above is higher than 50° C., there is a risk that the internal temperature of a foamable phenolic resin composition is excessively increased, the cell wall is destroyed because the timing of the curing comes earlier than expected, and the closed cell ratio is decreased. The temperature adjustment equipment can perform heating, keeping the heat, or cooling with temperature controlling water that passes through a jacket part of a double pipe jacket structure, for example. It can facilitate homogeneous foaming and curing by uniformizing the internal temperature of the foamable resin composition immediately after ejection to an arbitrary temperature, thereby increasing the homogeneity of density distribution in a thickness direction to improve the compression strength and the dimensional stability. The mixer 42 the introducing step (mixer 1 in FIG. 6) is also preferably provided with a temperature control function, and in this case, it is desired to control the mixer 42 at a temperature lower than that for a static mixer.

After that, the foamable phenolic resin composition that has been mixed in the introducing step described above is ejected on a surface of the first surface material 40*a*, which is positioned to face the second surface material 40*b*. The ejected foamable phenolic resin composition 50*a* becomes a foamable phenolic resin composition 50*a*2 in a foaming process, which has grown from the first surface material 40*a* side to the second surface material 40*b* side, heated in an oven 30, as a result of which a phenolic resin foam board 100 in which both surfaces of the main surface are covered with the surface material, is obtained.

The first surface material 40*a*, and the second surface material 40*b* are not particularly limited, however, a flexible surface material is preferred, and in particular, from the viewpoint of the ease of handling and the economic efficiency as a foam board, synthetic fiber nonwoven fabric, inorganic fiber nonwoven fabric, and papers are most preferred. Further, as needed, an inorganic substance such as aluminium hydroxide is contained, and the flame retardancy may be imparted.

The surface materials have only to travel in the same direction at a predetermined interval, of which the positional relationship may be in vertically parallel, or may also be in transversely parallel, as long as positioned to face each other as a surface material. The predetermined interval is required to be an interval suitable for the contact of the surface of the foamable phenolic resin composition in a foaming process that has grown from the first surface material side with the surface of the second surface material, and for the foaming and curing, and is determined in consideration of the thickness of the foam board to become a product.

The ejection of a foamable resin composition with a die, as disclosed in the specifications of WO 2009/066621 and Japanese Patent No. 5112940, enables producing a phenolic resin foam board that has favorable appearance and properties more simply with extremely high accuracy, efficiently, and stably for a long period of time, as compared with the conventional method. A technique of ejecting a foamable resin composition with a tube made of a resin as an ejection part, can also be preferably used.

Examples of the phenolic resin include a resol-type phenolic resin that is synthesized with an alkali metal hydroxide or an alkaline earth metal hydroxide, a novolak-type phenolic resin that is synthesized with an acid catalyst, an ammonia resol-type phenolic resin that is synthesized with ammonia, or a benzylether-type phenolic resin that is synthesized with a lead naphthenate, and the like. Among them, the resol-type phenolic resin is preferred.

The resol-type phenolic resin can be obtained by heating and polymerizing phenol and formalin as raw materials with an alkali catalyst in a temperature range of 40 to 100° C. As needed, an additive such as urea may be added during the polymerization of the resol resin. In a case of the addition of urea, it is preferred to mix the urea that has been methylolated by an alkali catalyst in advance with the resol resin. The resol resin after synthesis usually contains excessive water, therefore, it is preferred to adjust the water up to the water content that is suitable for the foaming, at the time of foaming. An aliphatic hydrocarbon, an alicyclic hydrocarbon having a high boiling point, or a mixture thereof, a diluent for viscosity adjustment such as ethylene glycol, and diethylene glycol, and other additives, as needed, can also be added into the phenolic resin.

The starting mole ratio of phenols to aldehydes in a phenolic resin is in a range of preferably 1:1 to 1:4.5, and more preferably 1:1.5 to 1:2.5. Examples of the phenols preferably used during the synthesis of a phenolic resin include phenol itself, and other phenols. Examples of the other phenols include resorcinol, catechol, o-, m- and p-cresols, xylenols, ethylphenols, and p-tert butylphenols. Binuclear phenols can also be used.

Examples of the aldehydes include formaldehyde itself, and other aldehydes. Examples of the other aldehydes include glyoxal, acetaldehyde, chloral, furfural, and benzaldehyde. Into the aldehydes, urea, dicyandiamide, and melamine may be added as an additive. In a case where these additives are added, a phenolic resin indicates a phenolic resin after the addition of an additive.

The foaming agent is not particularly limited, however, preferably contains a hydrocarbon. This is because the global warming potential is drastically small as compared with that of a fluorocarbon-based foaming agent. The content of the hydrocarbon contained in a phenolic resin foam board is preferably 50% by weight or more, more preferably 70% by weight or more, and particularly preferably 90% by weight or more based on the total weight of the foaming agent.

The hydrocarbon contained in a foaming agent is preferably an cyclic or chain alkane, alkene, and alkyne having 3 to 7 carbon atoms, and from the viewpoint of the foaming performance, the chemical stability (without containing a double bond), and the heat conductivity of a compound itself, more preferably an alkane, or a cycloalkane having 4 to 6 carbon atoms. Specific examples of the hydrocarbon include n-butane, isobutane, cyclobutane, n-pentane, isopentane, cyclopentane, neopentane, n-hexane, isohexane, 2,2-dimethylbutane, 2,3-dimethylbutane, and cyclohexane. Among them, pentanes of n-pentane, isopentane, cyclopentane, and neopentane, and butanes of n-butane, isobutane, and cyclobutane are particularly preferred because the heat conductivity is relatively small in addition that the foaming properties are comfortable in the production of a phenolic resin foam board.

The hydrocarbons contained in a foaming agent can also be used in a mixture of two or more kinds thereof. Specifically, a mixture of 5 to 95% by weight of pentanes and 95 to 5% by weight of butanes is preferred because favorable heat insulating properties are shown in a wide temperature range. Among them, the combination of n-pentane or iso-pentane, and isobutane exerts high heat insulating performance on a foam body in a wide range from a low temperature range to a high temperature range, and is preferred also because these compounds are inexpensive. A chlorinated hydrocarbon such as 2-chloropropane may be mixed as a blowing agent. Furthermore, when a hydrocarbon, and HFCs having a low boiling point, such as 1,1,1,2-tetrafluoroethane 1,1-difluoroethane, and pentafluoroethane are used in combination as a blowing agent, the low temperature properties of a foam body can be improved. However, the global warming potential of a mixed foaming agent becomes larger than that of a foaming agent having a hydrocarbon alone, therefore, it cannot be said that it is that much preferred to use HFCs in combination. Herein, it is a preferred embodiment to use 2,3,3,3-tetrafluoro-1-propene (HFO-1234yf), 1,3,3,3-tetrafluoro-1-propene (HFO-1234ze), difluoromethane (R32), and the like as a foaming agent having a low warming potential. A substance having a low boiling point such as nitrogen, helium, argon, and air may be used as a foam nucleating agent to be added into a foaming agent. When particles having an average particle diameter of 1 mm or less, such as foam body powders of a phenolic resin, and aluminium hydroxide powders are used as a foam nucleating agent as needed, the more homogeneous foaming can be obtained.

The curing catalyst is not particularly limited, however, is preferably an acid anhydride curing catalyst, for example, preferably phosphoric anhydride, and anhydrous aryl sulfonic acid, because when an acid containing water is used, there is a risk that rupture and the like of a cell film of a foamable phenolic resin composition may arise during the foaming and curing. Examples of the anhydrous aryl sulfonic acid include toluenesulfonic acid, xylene sulfonic acid, phenolsulfonic acid, a substituted phenolsulfonic acid, xylenol sulfonic acid, a substituted xylenol sulfonic acid, dodecylbenzenesulfonic acid, benzenesulfonic acid, and naphthalene sulfonic acid. These may be used singly, or in combination of two or more kinds thereof. Resorcinol, cresol, saligenin (o-methylolphenol), p-methylolphenol, and the like may be added as a curing auxiliary. These curing catalysts may be diluted with a solvent such as ethylene glycol, and diethylene glycol.

The amount an acid curing catalyst to be used differs depending on the kind, and in a case where phosphoric anhydride is used, the phosphoric anhydride is used in an amount of preferably 5 to 30 parts by weight, and more preferably 8 to 25 parts by weight based on 100 parts by weight of the phenolic resin. In a case where a mixture of 60% by weight of para toluene sulfonic acid monohydrate and 40% by weight of diethylene glycol, the mixture is used in an amount of preferably 3 to 30 parts by weight, and more preferably 5 to 20 parts by weight based on 100 parts by weight of the phenolic resin.

The surfactant used may be a surfactant that is generally used in the production of a phenolic resin foam board. Among them, a nonionic surfactant is effective, for example, an alkylene oxide that is a copolymer of ethylene oxide and propylene oxide, a condensate of an alkylene oxide and castor oil, a condensation product of aklylene oxide and alkylphenol such as nonylphenol or dodecylphenol, polyoxyethylene alkyl ethers, and further, fatty acid esters such as a polyoxyethylene fatty acid ester, a silicone-based compound such as polydimethylsiloxane, polyalcohols, and the like are preferred. These surfactants may be used singly, or in combination of two or more kinds thereof. The amount to be used is not particularly limited, however, the surfactant is preferably used in a range of 0.3 to 10 parts by weight per 100 parts by weight of the phenolic resin composition.

EXAMPLES

Hereinafter, the present invention will be described in more detail by way of Examples and Comparative Examples, but the present invention is not limited thereto.

Example 1

Into a reactor, 350 kg of 52% by weight formaldehyde, and 251 kg of 99% by weight phenol were charged, and stirred by a propeller-type stirrer. The liquid temperature inside the reactor was adjusted to 40° C. by a temperature controller. Next, the temperature was increased while adding 50% by weight of an aqueous solution of sodium hydroxide, and the reaction was performed. At the stage when the Ostwald viscosity reached 37 centistokes (=37×10$^{-6}$ m$^2$/s, measured value at 25° C.), the reaction mixture was cooled, and into the resultant mixture, 57 kg of urea (corresponding to 15 mol % of the charged amount of formaldehyde) was added. After that, the reaction mixture was cooled to 30° C., and neutralized to a pH of 6.4 with 50% by weight of an aqueous solution of para toluene sulfonic acid monohydrate. The reaction mixture was subjected to a dehydration treatment at 60° C. When the viscosity of the resultant mixture was measured, the viscosity at 40° C. was 13000 mPa·s. This was set as phenolic resin A-U-1.

Next, a block copolymer of ethylene oxide-propylene oxide was mixed as a surfactant in an amount of 4.0 parts by weight based on 100 parts by weight of the phenolic resin A-U-1, and a phenolic resin composition A was obtained. A composition B composed of 100 parts by weight of the phenolic resin composition A, 6 parts by weight of a mixture of 50% by weight of isopentane and 50% by weight of isobutane as a blowing agent, and 13 parts by weight of a mixture of 80% by weight of xylene sulfonic acid and 20% by weight of diethylene glycol as a curing catalyst, was supplied to a mixing head in which a temperature of a jacket part was controlled to 10° C. The mixing head (dynamic mixer) used had the same type structure as that of the one disclosed in JP-A No. H10-225993, the temperature of which was controlled to 10° C. That is, an introduction opening of a phenolic resin composition and a foaming agent was provided on an upper side surface, and an introduction opening of a curing catalyst was provided on a side surface in the vicinity of the center of the stirring part (mixing part) in which a rotor works for stirring (mixing).

After the stirring part, as shown in FIG. 6, a distribution pipe 10 composed of distribution paths of four stages of A to D (a distribution path is formed of a branch part 4 and multiple piping parts 3 connected on the downstream side of the branch part 4) was connected. A foamable resin composition was distributed and widened to reach 16 ejection openings 5, and then ejected on a lower surface material. Herein, a static mixer 6 was provided immediately before (the upstream side of) a branch part 4 on the downstream side in each piping part between a branch part 4 and a branch part 4 on the downstream side of it, in the distribution paths of four stages of A to D. A temperature of each jacket part of A to D was controlled to 18° C.

As the surface material, polyester non-woven fabric ("Spunbond E05030" manufactured by Asahi Kasei Fibers Corporation, weighted 30 g/m$^2$, and thickness 0.15 mm) was used. A foamable resin composition discharged from a mixer was sent to a double conveyor having a temperature of 78° C. so as to be sandwiched between surface materials while being foamed. The foamable resin composition was cured for 20 minutes of the retention time, and then cured for six hours in an oven at 110° C. to obtain a phenolic resin foam board having a thickness of 160 mm.

Example 2

A phenolic resin foam board having a thickness of 100 mm was obtained under the same conditions as in Example 1, except that the double conveyor was heated to 78° C., the retention time was set to 12 minutes, and the curing was performed for three hours in an oven at 110° C.

Example 3

A phenolic resin foam board having a thickness of 70 mm was obtained under the same conditions as in Example 1, except that the double conveyor was heated to 78° C., the retention time was set to 9 minutes, and the curing was performed for three hours in an oven at 110° C.

Example 4

A phenolic resin foam board having a thickness of 70 mm was obtained under the same conditions as in Example 3, except that the constitution in which a static mixer is arranged only in a distribution pipe in the distribution paths of A and C among the four distribution paths of A to D was employed.

Example 5

A phenolic resin foam board having a thickness of 70 mm was obtained under the same conditions as in Example 3, except that the constitution in which a static mixer is arranged only in a distribution pipe in the distribution path of C among the four distribution paths of A to D was employed.

Example 6

A phenolic resin foam board having a thickness of 70 mm was obtained under the same conditions as in Example 3, except that the temperature of a mixing head (dynamic mixer) was controlled to 8° C., and the temperature of a double conveyor was adjusted to 86° C.

Comparative Example 1

A phenolic resin foam board having a thickness of 160 mm was obtained using the same foamable resin composition and the same ejection equipment as those in Example 1, except that a static mixer was not used in the distribution paths of four stages of A to D.

Comparative Example 2

A phenolic resin foam board having a thickness of 70 mm was obtained using the same foamable resin composition and the same ejection equipment as those in Example 3, except that a static mixer was not used in the distribution paths of four stages of A to D.

Comparative Example 3

A phenolic resin foam board having a thickness of 160 mm was obtained under the same conditions as in Example 1, except that a distribution pipe directly connecting to a dynamic mixer and distributing to 12 flow paths was used, and a static mixer was not used. The temperature of a jacket part of the dynamic mixer was controlled to 10° C. and the temperature of a jacket part of the distribution path was controlled to 18° C.

Comparative Example 4

A phenolic resin foam board having a thickness of 70 mm was obtained under the same conditions as in Example 3, except that a distribution pipe directly connecting to a dynamic mixer and distributing to 12 flow paths was used, and a static mixer was not used. The temperature of a jacket part of the dynamic mixer was controlled to 10° C. and the temperature of a jacket part of the distribution path was controlled to 18° C.

In Comparative Examples 5 to 7, a distribution pipe directly connecting to a dynamic mixer and distributing to 24 flow paths was used. Specifically, a structure in which the same number (12 pieces) of distribution pipes were respectively arranged on the surfaces of two surface materials opposing each other, and a foamable resin composition mixed by a dynamic mixer was supplied onto a traveling upper surface of a surface material and a traveling lower surface of a surface material separately and almost at the same time, was employed. The surface material on the upper side, onto which a foamable resin composition was ejected, was provide with a mechanism in which slack to the lower side can be adjusted while keeping the contact with the surface material on the lower side due to own weight, so that the surface material on the upper side is not to come into contact with the surface material on the lower side after ejection.

Comparative Example 5

A phenolic resin foam board having a thickness of 160 mm was obtained under the same conditions as in Example 1, except that a foamable resin composition was mixed by a dynamic mixer, and then ejected by 12 pieces respectively onto the surfaces opposing to the surfaces of the traveling upper and lower surface materials by using a distribution pipe directly connecting to the dynamic mixer and distributing to 24 flow paths. The temperature of a jacket part of the dynamic mixer was controlled to 10° C. and the temperature of a jacket part of the distribution path was controlled to 18° C.

Comparative Example 6

A phenolic resin foam board having a thickness of 100 mm was obtained under the same conditions as in Example 2, except that a foamable resin composition was mixed by a dynamic mixer, and then ejected by 12 pieces respectively onto the surfaces opposing to the surfaces of the traveling upper and lower surface materials by using a distribution pipe directly connecting to the dynamic mixer and distributing to 24 flow paths. The temperature of a jacket part of the dynamic mixer was controlled to 10° C. and the temperature of a jacket part of the distribution path was controlled to 18° C.

Comparative Example 7

A phenolic resin foam board having a thickness of 70 mm was obtained under the same conditions as in Example 3, except that a foamable resin composition was mixed by a dynamic mixer, and then ejected by 12 pieces respectively onto the surfaces opposing to the surfaces of the traveling upper and lower surface materials by using a distribution pipe directly connecting to the dynamic mixer and distributing to 24 flow paths. The temperature of a jacket part of the dynamic mixer was controlled to 10° C. and the temperature of a jacket part of the distribution path was controlled to 18° C.

The phenolic resin foam boards obtained in Examples and Comparative Examples were evaluated as follows.

Density Measurement

Part of the foam boards in Examples and Comparative Examples was cut out into a pierce having a length of 200 mm, a width of 200 mm ($W_X$ and $L_X$ in FIG. 1 and FIG. 2 are 160 mm, respectively), and an original thickness. The cut specimen was sliced at approximately equal intervals of 8 mm or more to 10 mm or less from one main surface in a thickness direction to obtain specimens. The densities of the specimens were averaged, and the obtained value was used as the average density of the entire specimens. An H value was calculated from the difference of the average density of the entire specimens and the lowest density among the specimens. $D_i$ was calculated from these specimens, and it was evaluated whether or not a straight line that intersects the density distribution curve plotted with i on a horizontal axis and $D_i$ on a vertical axis, at four points, and is parallel to the horizontal axis is present.

The specimen cut out in the same manner was sliced into five pieces at equal intervals in a thickness direction, and the obtained specimens are set as P1, P2, P3, P4, and P5 in order from one main surface. P1 and P5, each of which contains a main surface, are excluded, and density $d_{P2}$ of P2, density $d_{P3}$ of P3, and density $d_{P4}$ of P4 were measured.

Closed Cell Ratio

In the center position in a thickness direction of a foam board, a small specimen having an around 25 mm square was cut out by using a band saw, and a sample volume V was measured according to a standard method using an air comparison-type densimeter (Model 1000, manufactured by Tokyo Science Co., Ltd.). The closed cell ratio was, as the following Equation (14), a value obtained by dividing a value that had been obtained by subtracting the volume of a cell wall calculated from the weight WT of the sample and the density of the resin from the volume V of the sample, by an apparent volume Va calculated from the external size of the sample. The measurement was performed in accordance with ASTM-D-2856 (C method). Herein, in a case of a phenolic resin, the density of the phenolic resin was set as 1.3 kg/L.

$$\text{Closed cell ratio (\%)}=(V-WT/1.3)/Va\times100 \quad (14)$$

Figure 7:
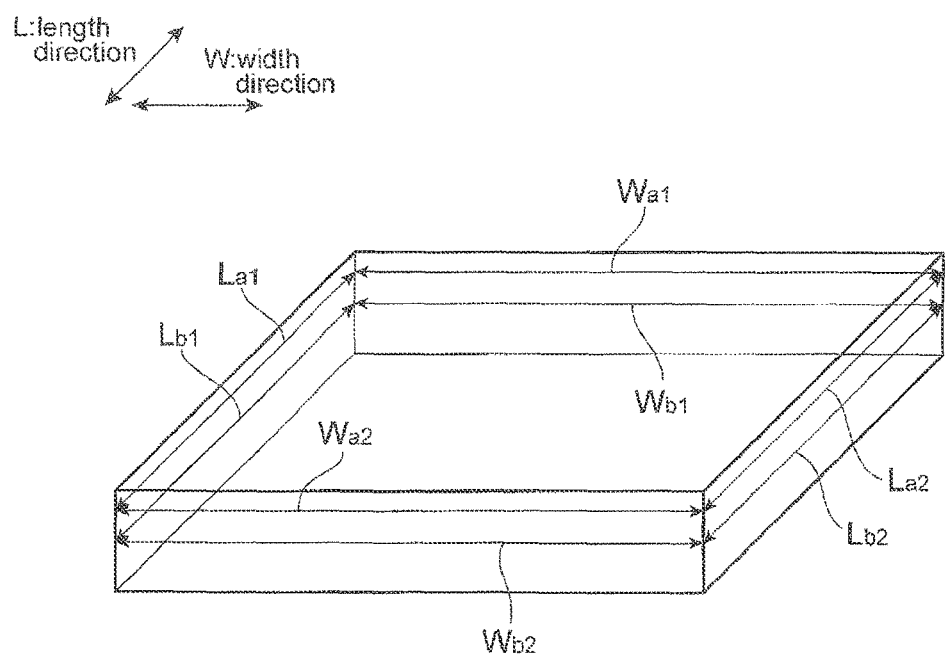
FIG. 7 is an overhead view showing measurement positions of the size in a specimen of a phenolic resin foam board.
Figure 8:
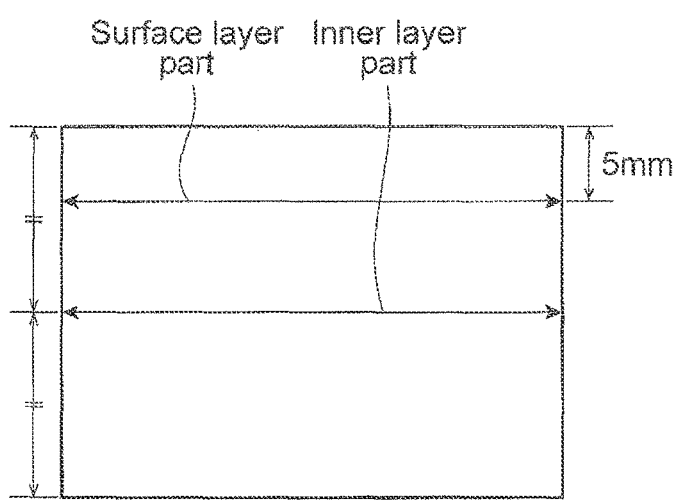
FIG. 8 is a side view showing measurement positions of the size in a specimen of a phenolic resin foam board.

Evaluation of Dimensional Stability A small specimen having a width of 300 mm, a length of 300 mm ($W_X$ and $L_X$ in FIG. 1 and FIG. 2 are 260 mm, respectively), and the same thickness as that of a foam body was cut out. The specimen was stored for around two weeks under the stability conditions (23° C. and 50% RH), sequentially, under the high humidity conditions (70° C. and 95% RH×48 hr), and the drying conditions (70° C. and 25% RH×48 hr), and then the width W, the length L, and the thickness T were measured, respectively after the lapse of 48 hr under the high humidity conditions, and after the lapse of 48 hr under the drying conditions. Herein, the size Wa of a surface layer part and the size Wb of an inner layer part of a foam body for the width W, and further, the size La of a surface layer part and the size Lb of an inner layer part of a foam body for the width L, were calculated, respectively by the following Equations (15) to (18) (see FIGS. 7 and 8).

Furthermore, under high humidity conditions, the dimensional change rate of the surface layer part, and the dimensional change rate of the inner layer part in a width direction W were set as $R_{wa}$, and $R_{wb}$, respectively, and the dimensional change rate of the surface layer part, and the dimensional change rate of the inner layer part in a length direction L were set as $R_{La}$, and $R_{Lb}$, respectively. These dimensional change rates were calculated by the following Equation (19), and then as a measure of the evaluation of the dimensional stability, the difference I between the dimensional change rates of the surface layer part and the inner layer part was calculated by the following Equations (20) and (21).

The difference J between the dimensional change rates of the surface layer part and the inner layer part under drying conditions was also calculated by the following Equations

(22) and (23). In a case where each of I, and J shows a positive value, a dented state (sink) was generated larger in the inner layer part than in the surface layer part, in a cross section of a foam body. Conversely, in a case where each of I, and J shows a negative value, an expanded state was generated larger in the inner layer part than in the surface layer part, in a cross section of a foam body.

The thickness T was measured under stability conditions, high humidity conditions, and drying conditions, and thickness change rates ($K_I$, and $K_J$) under high humidity conditions and under drying conditions were calculated by the following Equation (24).

The high humidity conditions and drying conditions in common

Width: Surface layer part $W_a = \{W_{a1} + W_{a2}\}/2$ (15)

Inner layer part $W_b = \{W_{b1} + W_{b2}\}/2$ (16)

Length: Surface layer part $L_a = \{L_{a1} + L_{a2}\}/2$ (17)

Inner layer part $L_b = \{L_{b1} + L_{b2}\}/2$ (18)

The dimensional change rates of a surface layer part and an inner layer part $R = ((\text{measured value}) - (\text{value in a stabilized state}))/$ value in a stabilized state (19)

Difference between dimensional change rates of a surface layer part and an inner layer part High humidity conditions, width direction: $I_W = R_{Wa} - R_{Wb}$ (20)

High humidity conditions, length direction: $I_L = R_{La} - R_{Lb}$ (21)

Drying conditions, width direction: $J_W = R_{Wa} - R_{Wb}$ (22)

Drying conditions, length direction: $J_L = R_{La} - R_{Lb}$ (23)

Thickness change rates under high humidity conditions and under drying conditions $K = ((\text{measured value}) - (\text{value in a stabilized state}))/$ (value in a stabilized state) (24)

The width W and the length L were measured in the central part in a thickness direction, and in the vicinity of a surface layer (at a position of 5 mm from a surface material in a thickness direction) of a small specimen. The width and the length were, as in FIGS. 7 and 8, taken the average value of two points of each width direction/length direction as the measured value. The thickness was, as in FIGS. 1 and 2, taken the average value of the measured four points as the measured value.

Evaluation of Ejection Unevenness

After the lapse of two hours from the ejection start, the ejection speed of upper and lower surface materials was temporarily accelerated, and each bead weight $W_n$ was measured while keeping the n pieces of foamable resin compositions having a belt shape (hereinafter, referred to as "bead"), which had been ejected onto the traveling lower surface material, from coming into contact with each other.

Herein, the average value of $W_n$ was set as $W_{ave}$ proportion $Q_n$ of the ejection amount in each bead was calculated according to the following Equation (25), and the difference Q between the maximum value $Q_{max}$ and the minimum value $Q_{min}$ among $Q_n$s was determined (Equation (26)).

$Q_n = (W_n - W_{ave})/W_{ave}$ (25)

$Q = Q_{max} - Q_{min}$ (26)

Resin Temperature of Foam Flow Path Opening Part

The resin temperature of a distribution flow path opening part was an average value of the values of two points measured by a thermocouple provided in the vicinity of central part of the ejection opening at both ends of east and west in the lower surface material side.

The production conditions of the foam board obtained from the Examples and Comparative Examples are summarized in Table 1.

TABLE 1

| | Thickness (mm) | Pipe temperature control (° C.) Dynamic mixer | Pipe temperature control (° C.) Distribution flow path | Resin temperature (° C.) of distribution flow path opening part | Presence or absence of static mixer |
|---|---|---|---|---|---|
| Ex. 1 | 160 | 10 | 18 | 45 | Presence |
| Ex. 2 | 100 | 10 | 18 | 44 | Presence |
| Ex. 3 | 70 | 10 | 18 | 43 | Presence |
| Ex. 4 | 70 | 10 | 18 | 44 | Partly presence |
| Ex. 5 | 70 | 10 | 18 | 41 | Partly presence |
| Ex. 6 | 70 | 8 | 8 | 31 | Presence |
| Comp. Ex. 1 | 160 | 10 | 18 | 55 | Absence |
| Comp. Ex. 2 | 70 | 10 | 18 | 53 | Absence |
| Comp. Ex. 3 | 160 | 10 | 18 | 52 | Absence |
| Comp. Ex. 4 | 70 | 10 | 18 | 51 | Absence |
| Comp. Ex. 5 | 160 | 10 | 18 | 52 | Absence |
| Comp. Ex. 6 | 100 | 10 | 18 | 51 | Absence |
| Comp. Ex. 7 | 70 | 10 | 18 | 51 | Absence |

The properties of the obtained foam product were evaluated as to the following eight items. Only for the ones that satisfy all items overall evaluation was determined to be "A".

H value: 0.12 or less.

Straight line parallel to the horizontal axis that can intersects the density distribution curve at four points: not present.

$d_{p2}/d_{p3}$: 1 or more.

$d_{p4}/d_{p3}$: 1 or more.

I value: the absolute value is 0.2 or less in both of the width direction, and the length direction.

J value: the absolute value is 0.2 or less in both of the width direction, and the length direction.

$K_I$ value: 1.5 or less.

$K_J$ value: the absolute value is less than 0.2.

Q value: 0.3 or less.

The evaluation results of the foam board obtained from the Examples and Comparative Examples are shown in Table 2.

TABLE 2

| | Density deviation H value | Presence of straight line parallel to horizontal axis that intersects density distribution curve at four points | $dp_2/dp_3$ | $dp_4/dp_3$ | Density (kg/m³) | Closed cell ratio (%) | Width W $I_W$ $J_W$ | Length L $I_L$ $J_L$ | Thickness $K_I$ $K_J$ | Ejection unevenness Q value | Overall evaluation |
|---|---|---|---|---|---|---|---|---|---|---|---|
| Ex. 1 | 0.043 | No | 1.01 | 1.00 | 29.1 | 93.0 | −0.07 0.09 | −0.18 0.10 | 0.53 0.18 | ≤0.20 | A |
| Ex. 2 | 0.098 | No | 1.03 | 1.03 | 28.9 | 94.6 | 0.06 0.15 | −0.04 0.19 | 1.13 0.04 | ≤0.20 | A |
| Ex. 3 | 0.098 | No | 1.05 | 1.04 | 27.5 | 95.1 | 0.07 0.14 | −0.06 0.17 | 1.31 0.11 | ≤0.20 | A |
| Ex. 4 | 0.104 | No | 1.05 | 1.05 | 27.4 | 92.8 | 0.08 0.14 | −0.08 0.17 | 1.33 0.11 | ≤0.21 | A |
| Ex. 5 | 0.112 | No | 1.05 | 1.05 | 27.1 | 91.1 | 0.13 0.17 | −0.14 0.19 | 1.41 0.14 | ≤0.25 | A |
| Ex. 6 | 0.101 | No | 1.05 | 1.05 | 26.7 | 93.2 | 0.09 0.13 | −0.10 0.17 | 1.34 0.12 | ≤0.20 | A |
| Comp. Ex. 1 | 0.221 | No | 1.08 | 1.09 | 27.2 | 78.7 | −0.20 0.22 | −0.30 0.31 | 1.43 0.44 | 0.81 | C |
| Comp. Ex. 2 | 0.242 | No | 1.10 | 1.10 | 27.9 | 79.3 | 0.18 0.25 | −0.13 0.25 | 1.61 0.32 | 0.82 | C |
| Comp. Ex. 3 | 0.123 | No | 1.06 | 1.07 | 28.5 | 79.1 | −0.14 0.12 | −0.27 0.18 | 0.59 −0.20 | ≤0.30 | C |
| Comp. Ex. 4 | 0.173 | No | 1.09 | 1.09 | 27.1 | 82.0 | 0.28 0.31 | 0.29 0.34 | 1.60 0.53 | ≤0.30 | C |
| Comp. Ex. 5 | 0.117 | Yes | 0.97 | 0.98 | 29.1 | 90.1 | −0.13 0.24 | −0.22 0.19 | 1.11 0.30 | ≤0.30 | C |
| Comp. Ex. 6 | 0.118 | Yes | 0.99 | 0.99 | 28.4 | 91.2 | 0.17 0.21 | −0.12 0.27 | 1.34 0.28 | ≤0.30 | C |
| Comp. Ex. 7 | 0.120 | Yes | 1.02 | 1.01 | 28.6 | 91.8 | 0.19 0.29 | −0.10 0.21 | 1.77 0.24 | ≤0.30 | C |

As shown in Table 1 and Table 2, Examples 1 to 6 gave foam bodies having a small density deviation (H value) of 0.12 or less in a thickness direction, and having high dimensional stability, as phenolic resin foam bodies with a thickness of 70, 100, or 160 mm. Due to the effect that the internal temperature of a foamable resin composition is uniformized by a static mixer, the closed cell ratio of the obtained foam body showed a favorable value of 90% or more, and the ejection unevenness (Q value) was small even after the lapse of two hours from the start of operation, which suggests that the production can be performed stably for a long time. Particularly, in Examples 1 to 3, foam bodies having a density deviation (H value) of 0.10 or less in a thickness direction, and having extremely high dimensional stability were obtained. In Example 6, the stain adhesion onto an inner wall of a pipe was suppressed by the lowering of the pipe temperature control, and the operation could be performed stably for a long time as compared with that in Example 3.

On the other hand, in Comparative Examples 1 and 2, in which a static mixer was not used, the ejection unevenness (Q value) of the ejected foamable resin composition increased, the yield decreased because a foam body having a homogenized thickness in a width direction had not been obtained, and further, the density deviation (H value) in a thickness direction became high. In the evaluation of dimensional stability of both of Comparative Examples 1 and 2, remarkable sink was confirmed in a cross section due to the shrinkage under drying conditions, and the shrinkage amount in a thickness direction became large. The resin temperature in a distribution flow path opening part (ejection opening) became 50° C. or more, and the cell wall was destroyed because of the rapid increase of the internal temperature of a foam body, as a result of which the closed cell ratio was less than 80%.

In Comparative Examples 3 and 4, direct distribution into 12 flow paths from an introduction part of a dynamic mixer was performed, and the ejection unevenness (Q value) was small even after the lapse of two hours from the start of operation. However, since a static mixer was not used, the internal temperature of a foamable resin composition was not uniformized, and the density in a thickness direction had an asymmetric distribution in a vertical direction. In the foam body of Comparative Example 3, remarkable cross-section sink and cross-section expansion were confirmed in a cross section in a length direction. In the foam body of Comparative Example 4, remarkable cross-section sink was confirmed both in a width direction and in a length direction. The resin temperature in a distribution flow path opening part (ejection opening) became 50° C. or more, and the cell wall was destroyed because of the rapid increase of the temperature inside a foam body, as a result of which the closed cell ratio was less than 90%.

Figure 10:
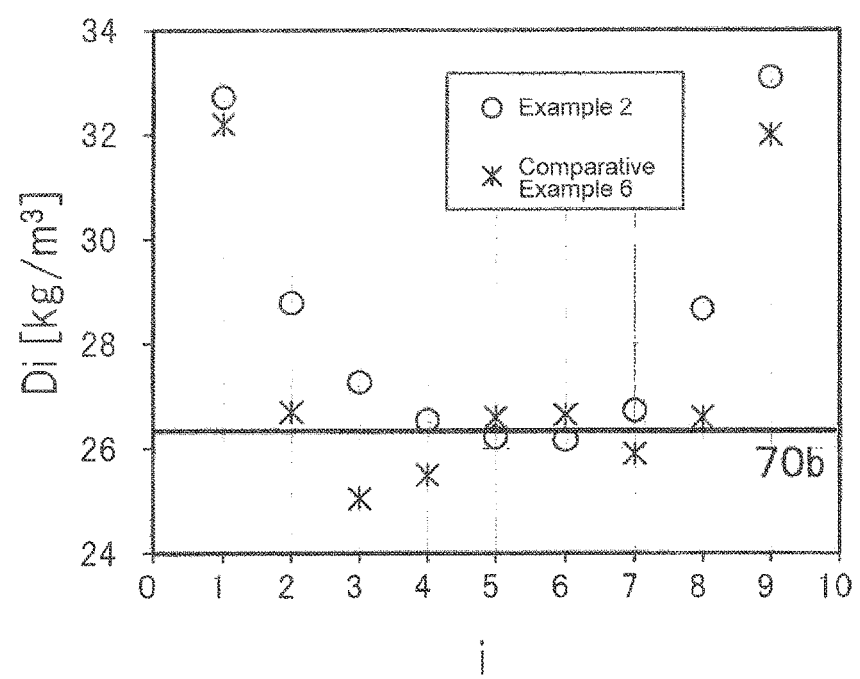
FIG. 10 is a drawing showing a density distribution curve of Example 2, and Comparative Example 6 in a phenolic resin foam board of the present embodiment.
Figure 11:
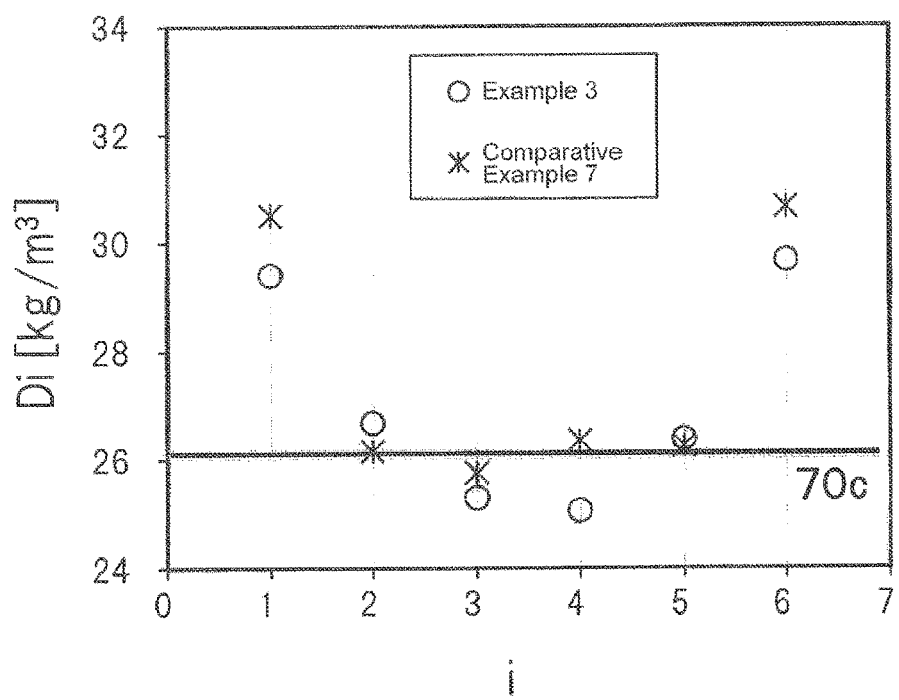
FIG. 11 is a drawing showing a density distribution curve of Example 3, and Comparative Example 7 in a phenolic resin foam board of the present embodiment.

In Comparative Examples 5 to 7, distribution into 24 flow paths from an introduction part of a dynamic mixer was performed, and a foamable phenolic resin composition were ejected into 12 pieces almost at the same time at each of the positions opposing to each other on the upper and lower surface materials. According to this, the rapid increase of the temperature inside a foam body was suppressed, therefore, a closed cell ratio became 90% or more, and the density deviation (H value) in a thickness direction was also favorable. On the other hand, as shown in FIGS. 9 to 11, in any of the samples in Comparative Examples 5 to 7, a straight line parallel to the horizontal axis (70a, 70b, and 70c), of which the number of the points that intersects the density distribution curve plotted with $D_i$ on a vertical axis for i on the horizontal axis can be four, was present, and cross-section sink under drying conditions was remarkably confirmed.

Particularly, in Comparative Examples 5 and 6, the density of P3 was higher than the densities of P2 and P4, therefore, a layer in which the density becomes maximum in a thickness direction was present, and warpage and deflection were generated on the entire board.

INDUSTRIAL APPLICABILITY

According to the present invention, a phenolic resin foam board, which exhibits sufficient compression strength and heat conductivity for practical use even when the thickness of a product increases, and which has excellent dimensional stability as compared with a conventional product, and a production method thereof can be provided.

REFERENCE SIGNS LIST 1, 42: dynamic mixer; 2: introduction piping part; 3: piping part, 4: branch part; 5, 46: ejection opening (ejection part); 6: static mixer (static mixer); A to D: distribution path; 10, 43: distribution pipe; 40a: first surface material; 40b: second surface material; 50a, 50a2: foamable phenolic resin composition; 60a, 60b: slat-type double conveyor.

The invention claimed is:

1. A phenolic resin foam board having a thickness of 40 mm or more to 180 mm or less, wherein
   a closed cell ratio of the phenolic resin foam board is 90% or more,
   when the phenolic resin foam board is sliced, from one main surface of the phenolic resin foam board, along the main surface into n pieces (n≥5) at approximately equal intervals of 8 mm or more to 10 mm or less in a thickness direction, a density of an n-th specimen is $d_n$, an average density of n pieces of specimens is $d_{ave}$, and a lowest density among the densities of n pieces of specimens is $d_{min}$, $0 \leq (d_{ave}-d_{min})/d_{ave} \leq 0.12$ is established,
   when values for $D_i=(d_i+d_{(i+1)})/2$ are calculated [wherein i represents an integer of 1 to (n−1)], $D_i$ values are plotted in order of a numerical value of i (wherein a horizontal axis indicates i values and a vertical axis indicates $D_i$ values), points corresponding to the $D_i$ values are connected, resulting in a density distribution curve, no straight line parallel to the horizontal axis intersects the density distribution curve at four points; and
   wherein the phenolic resin foam board possesses the following properties:
   I value of a dimensional change rate: the absolute value is 0.2 or less in both of the width direction, and the length direction under humidity conditions,
   J value of a dimensional change rate: the absolute value is 0.2 or less in both of the width direction, and the length direction under drying conditions,
   $K_I$ value of a thickness change rate: 1.5 or less under humidity conditions, and
   $K_J$ value of a thickness change rate: the absolute value is less than 0.2 under drying conditions.

2. The phenolic resin foam board according to claim 1, wherein
   when specimens obtained by equally dividing the phenolic resin foam board into five pieces along the main surface of the phenolic resin foam board in a thickness direction is set as P1, P2, P3, P4, and P5 in order from the main surface, at least either one of $d_{P3} \leq d_{P2}$, or $d_{P3} \leq d_{P4}$ is established among a density $d_{P2}$ of P2, a density $d_P3$ of P3, and a density $d_{P4}$ of P4.

3. The phenolic resin foam board according to claim 1, wherein the thickness is 70 mm or more to 180 mm or less.

4. The phenolic resin foam board according to claim 1, wherein a density of the entire phenolic resin foam board is 10 kg/m³ or more to 100 kg/m³ or less.

5. The phenolic resin foam board according to claim 1, wherein a heat conductivity is 0.023 W/m·K or less.

6. The phenolic resin foam board according to claim 1, comprising a hydrocarbon and/or a chlorinated hydrocarbon.

7. The phenolic resin foam board according to claim 1, wherein the thickness is 80 mm or more to 180 mm or less.

8. The phenolic resin foam board according to claim 1, wherein the thickness is 100 mm or more to 160 mm or less.

9. The phenolic resin foam board according to claim 1, wherein the phenolic resin foam board is produced by a method, which method comprises:
   providing an apparatus having a mixer, an ejection opening, a distribution pipe disposed between the mixer and the ejection opening, and a static mixer disposed in the distribution pipe;
   introducing into the mixer and mixing a phenolic resin, a foaming agent, and a curing agent to obtain a foamable phenolic resin composition;
   transferring the foamable phenolic resin composition from the mixer to the ejection opening via the distribution pipe;
   mixing the foamable phenolic resin composition by the static mixer in the distribution pipe during the transferring of the foamable phenolic resin composition from the mixer to the ejecting opening; and
   ejecting the foamable phenolic resin composition from the ejection opening onto a traveling surface material, so that the phenolic resin foam board is produced.

* * * * *